United States Patent
Kato et al.

(10) Patent No.: US 8,215,947 B2
(45) Date of Patent: Jul. 10, 2012

(54) MOLDING DIE

(75) Inventors: Takashi Kato, Utsunomiya (JP); Kazuhisa Fujiwara, Tochigi-ken (JP); Takuya Eto, Utsunomiya (JP); Takashi Nagata, Sakura (JP); Tomoyuki Ishiyama, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 81 days.

(21) Appl. No.: 12/785,979

(22) Filed: May 24, 2010

(65) Prior Publication Data

US 2010/0303948 A1 Dec. 2, 2010

(30) Foreign Application Priority Data

May 27, 2009 (JP) .................................. 2009-128179

(51) Int. Cl.
*B29C 43/32* (2006.01)

(52) U.S. Cl. . 425/520; 425/412; 425/441; 425/DIG. 53; 425/DIG. 247

(58) Field of Classification Search .......... 425/518–521, 425/412, 441, 542, DIG. 53, DIG. 247
See application file for complete search history.

(56) References Cited

U.S. PATENT DOCUMENTS

| | | | | |
|---|---|---|---|---|
| 5,410,927 | A | * | 5/1995 | Omata et al. ..................... 83/139 |
| 5,603,968 | A | * | 2/1997 | Tajiri et al. ..................... 425/556 |
| 7,104,781 | B2 | * | 9/2006 | Iwata et al. ..................... 425/542 |

FOREIGN PATENT DOCUMENTS

JP 58-033091 B2 7/1983

* cited by examiner

*Primary Examiner* — Richard Crispino
*Assistant Examiner* — Thukhanh Nguyen
(74) *Attorney, Agent, or Firm* — Arent Fox LLP (57) ABSTRACT

A molding die includes a fixed die, a movable die movable toward and away from the fixed die, a first slide core slidable in sliding engagement with the fixed die, and a second slide core having a presser for pressing the first slide core when the second slide core is held in pressing contact with the first slide core. The fixed die, the movable die, the first slide core, and the second slide core jointly define a cavity for molding a product. The presser includes a reactive force plate for producing reactive forces against the pressure of a molten material introduced into the cavity.

8 Claims, 7 Drawing Sheets

MOLDING DIE

CROSS-REFERENCE TO RELATED APPLICATION

This application is based upon and claims the benefit of priority from Japanese Patent Application No. 2009-128179 filed on May 27, 2009, of which the contents are incorporated herein by reference.

BACKGROUND OF THE INVENTION

1. Field of the Invention

The present invention relates to a molding die, and more particularly to a molding die for molding a synthetic-resin product having an inward curved or bent edge, such as an automotive engine hood or an automotive bumper for automobiles.

2. Description of the Related Art

Various molding processes have been used, including injection molding, compression molding, flow molding, etc., for molding synthetic resin material products. Dies for use in such molding processes need to be highly durable and capable of molding complex shapes in order to form mass-produced moldings.

When a resin molding having an inward bent edge, such as an automobile bumper, is to be molded by dies, since the synthetic resin material flows in a reverse direction at the bent edge, a slide core for molding the bent edge has to be used, in addition to a pair of dies, i.e., a fixed die and a movable die.

If the mating surfaces of the fixed die, the movable die, and the slide core are not sufficiently accurate, then the synthetic resin material tends to develop burrs at mating surfaces on the resin-molded product, while also leaving parting lines, which are caused by mating surfaces of the fixed die, the movable die and the slide core, on the outer surface of the resin-molded product. Thus, the outer surface of the resin-molded product becomes lower in quality.

Various technical approaches have been proposed to ensure that the mating surfaces of the fixed die, the movable die, and the slide core are accurate enough.

For example, Japanese Patent Publication No. 58-033091 discloses a method of and an apparatus for manufacturing a synthetic resin product having an inward bent edge. According to the disclosed method and apparatus, pressing cylinders are provided along directions in which a slide core is movable, and also along directions perpendicular to the direction in which the slide core is movable. Consequently, the slide core can be pressed strongly toward the fixed die and the movable die, in order to ensure that the mating surfaces of the fixed die, the movable die, and the slide core are accurate enough.

A molding die for manufacturing a synthetic resin product, which is disclosed in Japanese Patent Publication No. 58-033091, employs a cylinder as a pressing means for ensuring that the mating surfaces of the fixed die, the movable die, and the slide core are accurate enough. Since the pressure applied to the slide core depends on the capability of the cylinder, it may be necessary to use a cylinder having a high pressing capability, or even a plurality of cylinders, depending on the pressure under which the molten synthetic resin is injected into the cavity. However, according to the disclosure of Japanese Patent Publication No. 58-033091, the molding die itself has to be sufficiently large in size, because the cylinder or cylinders must be disposed within the molding die. Furthermore, inasmuch as the movable die is pressed by the cylinder, the cylinder imposes limitations on the position where the movable die is installed. The molding die also is likely to lose desired mechanical strength at the position where the cylinder is installed, or the molding die may fail to produce necessary die fastening forces.

SUMMARY OF THE INVENTION

It is a general object of the present invention to provide a molding die, which is excellent in durability, is small in size, possesses sufficient mechanical strength, and can produce sufficient die fastening forces.

A major object of the present invention is to provide a molding die, which is capable of minimizing burrs and parting lines on a molded product.

According to a first aspect of the present invention, a molding die comprises a fixed die including an actuator, a movable die facing the fixed die and movable toward and away from the fixed die, a slide core slidable in sliding engagement with the fixed die, and a presser for pressing the slide core in a direction transverse to directions in which the slide core is slidable. The presser includes a member for producing reactive forces against the pressure of a molten material, which is introduced into a cavity defined between the fixed die, the movable die, and the slide core, in order to mold a product with an undercut.

With the above arrangement, since the presser, which includes the member for producing reactive forces against the pressure of the molten material, firmly presses the slide core against the fixed die, burrs are prevented from being formed at mating surfaces of the fixed die and the slide core. Since the presser presses the slide core under such reactive forces against the pressure of the molten material, the molding die does not require a pressing cylinder. Thus, the molding die does not become increased in size, and can produce a molded product regardless of the type of molten material that fills the cavity.

In the molding die according to the first aspect of the present invention, the member for producing reactive forces is made of a resilient material.

Since the presser, which presses the slide core against the fixed die under reactive forces against the pressure of the molten material, is made of a resilient material, the presser may be small in size, and is more effective at preventing burrs from being formed at mating surfaces of the fixed die and the slide core.

In the molding die according to the first aspect of the present invention, the presser is mounted on the movable die in pressing contact with the slide core, and faces toward a direction in which molten material is introduced into the cavity.

Inasmuch as the presser bears the pressure of the molten material, and also generates reactive forces against the pressure of the molten material, the molding die is closed and clamped under increased forces. Thus, the product molded by the molding die is free of parting lines due to the slide core.

In the molding die according to the first aspect of the present invention, the member for producing reactive forces is made of urethane.

Since the member for producing reactive forces is made of urethane, which produces large repulsive forces, the presser is able to press the slide core against the fixed die while overcoming the pressure of the molten material.

According to a second aspect of the present invention, a molding die comprises a fixed die including a first actuator, a movable die facing the fixed die and movable toward and away from the fixed die, a first slide core slidable in sliding engagement with the fixed die, and a second slide core disposed in a position facing the fixed die across the first slide core, and movable into and out of abutment against the movable die and the first slide core. The second slide core has a presser for pressing the first slide core in a direction transverse to directions in which the first slide core is slidable when the second slide core is held in pressing contact with the first slide core, and the movable die has a second actuator for displacing the second slide core. The presser includes a member for producing reactive forces against the pressure of a molten material, which is introduced into a cavity defined between the fixed die, the movable die, the first slide core, and the second slide core, in order to mold a product with an undercut.

With the above arrangement, the presser including the member for producing the reactive forces against the pressure of the molten material firmly presses the first slide core against the fixed die. Thus, burrs are prevented from being formed at mating surfaces of the fixed die and the first slide core. Since the presser presses the first slide core under such reactive forces against the pressure of the molten material, the molding die does not require a pressing cylinder. Thus, the molding die does not become increased in size, and can produce a molded product regardless of the type of molten material that fills the cavity.

In the molding die according to the second aspect of the present invention, the member for producing reactive forces is made of a resilient material.

Since the presser, which presses the slide core against the fixed die under reactive forces against the pressure of the molten material, is made of a resilient material, the presser may be small in size, and is more effective at preventing burrs from being formed at mating surfaces of the fixed die and the slide core.

In the molding die according to the second aspect of the present invention, the presser is mounted on the second slide core in pressing contact with the first slide core, and faces toward a direction in which molten material is introduced into the cavity.

Inasmuch as the presser bears the pressure of the molten material, and also generates reactive forces against the pressure of the molten material, the molding die is closed and clamped under increased forces. Thus, the product molded by the molding die is free of parting lines due to the slide core.

In the molding die according to the second aspect of the present invention, the member for producing reactive forces is made of urethane.

Since the member for producing reactive forces is made of urethane, which produces large repulsive forces, the presser is able to press the slide core against the fixed die while overcoming the pressure of the molten material.

According to the present invention, the pressure of the molten material, which is introduced into the cavity defined between the fixed die, the movable die, and the slide core, is borne by the reactive force plate of the presser. Therefore, the molding die does not require a pressing cylinder, but rather, the fixed die, the movable die, and the slide core are securely held together to define a cavity under reactive forces produced by the member of the presser. Even when the molding die is required to produce a large number of molded products, mating surfaces of the fixed die, the movable die, and the slide core are maintained at a high level of accuracy. The molded products thus are prevented from developing burrs, and have surfaces with excellent appearance, which are free of parting lines caused by mating surfaces of the fixed die, the movable die, and the slide core. Further, the molding die, which is capable of producing such high-quality molded products, may be compact in size.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Molding dies according to embodiments of the present invention in relation to an automotive engine hood and an automotive bumper, which are molded using the aforementioned molding dies, will be described in detail below with reference to the accompanying drawings.

Figure 1:
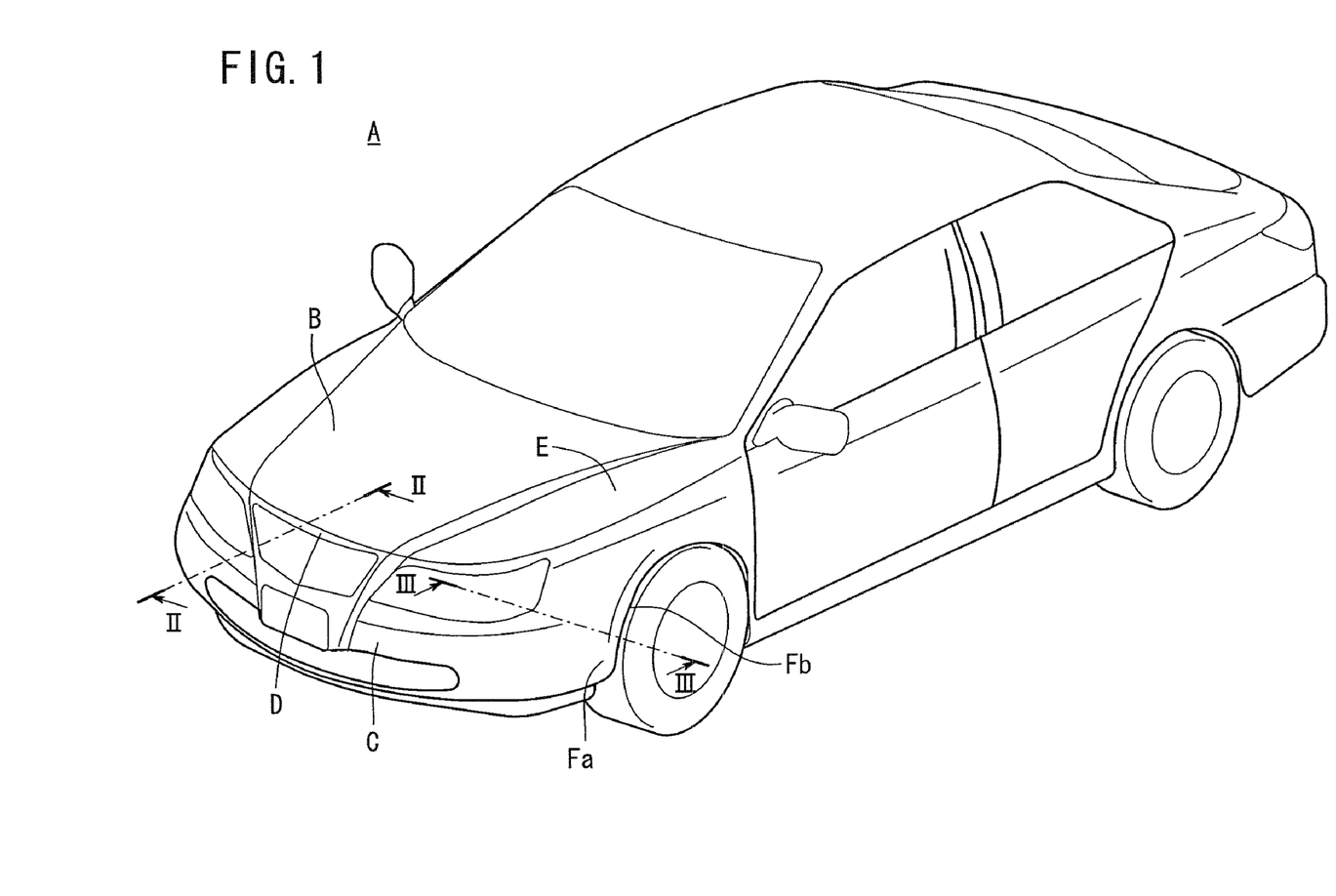
FIG. 1 is a perspective view of an automobile incorporating an automotive engine hood and an automotive bumper, which are molded using molding dies according to the present invention.

FIG. 1 shows an automobile A incorporating an automotive engine hood B and an automotive bumper C, which are molded using molding dies according to the present invention. The automotive engine hood B and the automotive bumper C include inward curved or bent edges, which are formed as portions Fa, Fb of a fender E, for example, near a front grill D of the automobile A, and a tire housing where a front wheel tire is disposed.

Figure 2:
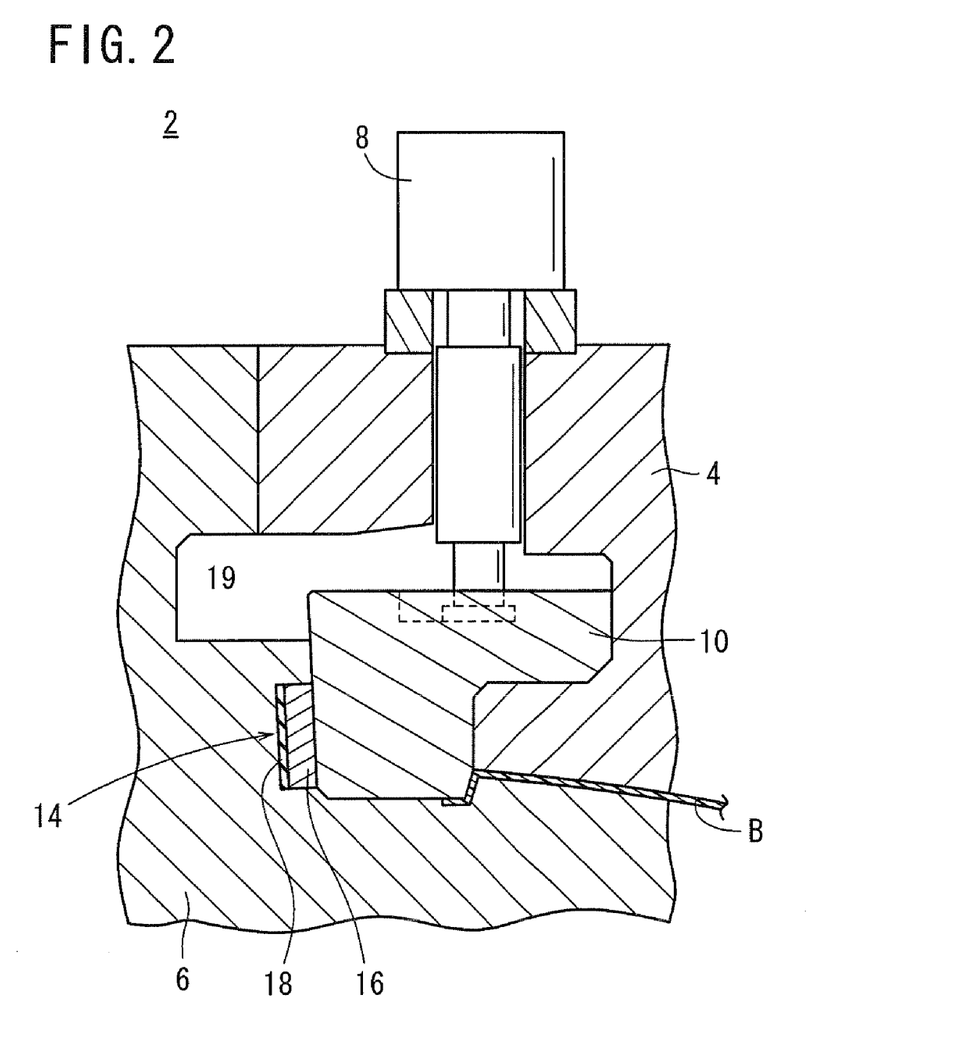
FIG. 2 is a fragmentary cross-sectional view of a molding die according to a first embodiment of the present invention, for molding a portion, the cross section of which is taken along line II-II of FIG. 1.

As shown in FIG. 2, the automotive engine hood B is molded using a molding die 2 according to a first embodiment of the present invention. FIG. 2 is a cross-sectional view taken along line II-II of FIG. 1, which shows the molded portion and the molding die 2 used to produce the molded portion. The molding die 2 includes a fixed die 4 and a movable die 6. A fluid-pressure cylinder 8 is mounted on the fixed die 4. The fluid-pressure cylinder 8 includes a piston rod, which supports a slide core 10 on a distal end thereof. The fixed die 4, the movable die 6, and the slide core 10 jointly define a cavity for molding the engine hood B. The movable die 6 includes a presser 14, which faces toward a direction in which a molten synthetic resin for producing the engine hood B flows. The presser 14 comprises a pressing contact plate 16 and a reactive force plate 18. When the molding die 2 is closed and clamped, the pressing contact plate 16 is held in pressing contact with a portion of the slide core 10. The fixed die 4, the movable die 6, and the slide core 10 also jointly define a chamber 19. The slide core 10 is displaceable inside the chamber 19. The reactive force plate 18 preferably is made of a resin of urethane.

The molding die 2 according to the first embodiment of the present invention basically is constructed as described above. Operations and advantages of the molding die 2 will be described below.

The fluid-pressure cylinder 8, which is mounted on the fixed die 4, is actuated in one direction to retract the piston rod upwardly in FIG. 2, and then the movable die 6 is displaced upwardly. Once the movable die 6 is firmly held against the fixed die 4, the fluid-pressure cylinder 8 is actuated in an opposite direction so as to extend the piston rod downwardly in FIG. 2. The slide core 10 in the chamber 19 is brought into contact with a portion of the movable die 6, whereupon surfaces of the movable die 6, the slide core 10, and the fixed die 4 jointly make up a cavity for molding the engine hood B. At this time, the pressing contact plate 16 of the presser 14 is positioned in confronting relation to the cavity.

When a molten synthetic resin is introduced from a gate (not shown) into the cavity, the pressure of the molten synthetic resin is applied to the presser 14 through the slide core 10. More specifically, the pressure of the molten synthetic resin is borne by the pressing contact plate 16. Since the pressing contact plate 16 is backed up by the reactive force plate 18, the pressing contact plate 16 presses the slide core 10 against the fixed die 4 and the movable die 6 under a reactive force from the reactive force plate 18, which is made of urethane. The fixed die 4, the movable die 6, and the slide core 10 are securely pressed against each other to such an extent that any parting lines caused by mating surfaces of the fixed die 4, the movable die 6, and the slide core 10 will not be significantly visible. When the synthetic resin introduced into the cavity becomes solidified, thereby forming the engine hood B, the movable die 6 is lowered in order to separate the presser 14 away from the slide core 10. The fluid-pressure cylinder 8 is actuated to retract the piston rod, thereby moving the slide core 10 upwardly in the chamber 19. The engine hood B can now easily be separated from the fixed die 4.

A molding die 20 according to a second embodiment of the present invention will be described in detail below with reference to FIGS. 3 through 7.

The molding die 20 according to the second embodiment is used to mold portions Fa, Fb of the fender E, as shown in FIG. 1.

Figure 3:
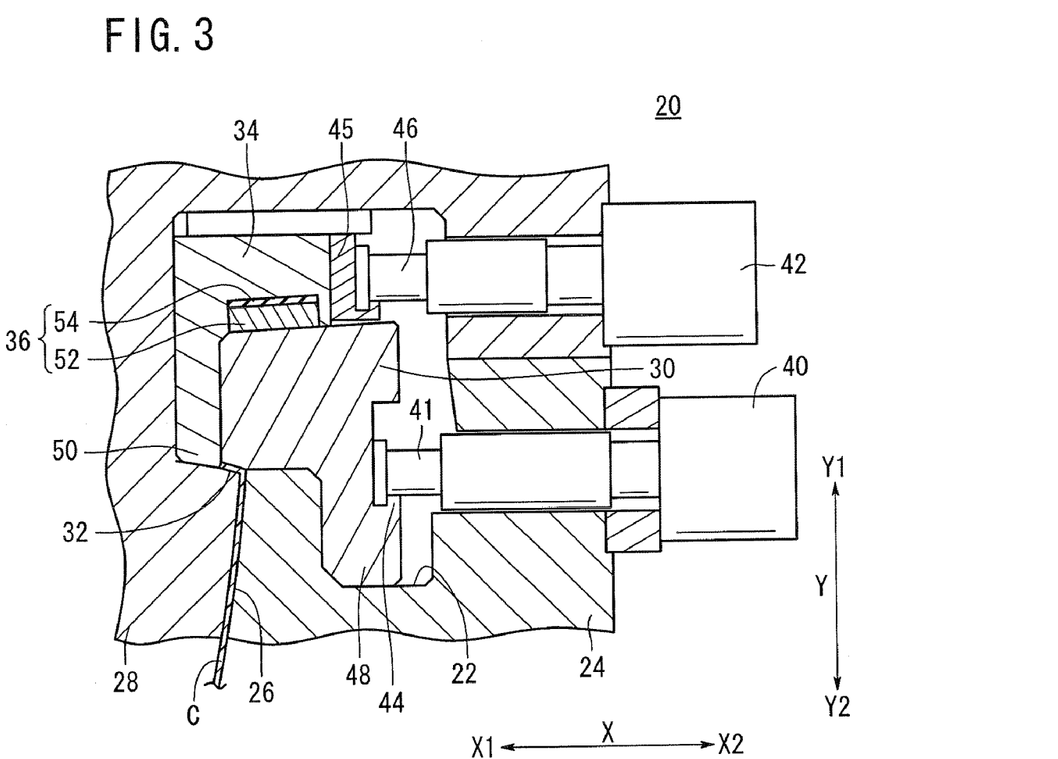
FIG. 3 is a fragmentary cross-sectional view of a molding die according to a second embodiment of the present invention, for molding a portion, the cross section of which is taken along line of FIG. 1.
Figure 4:
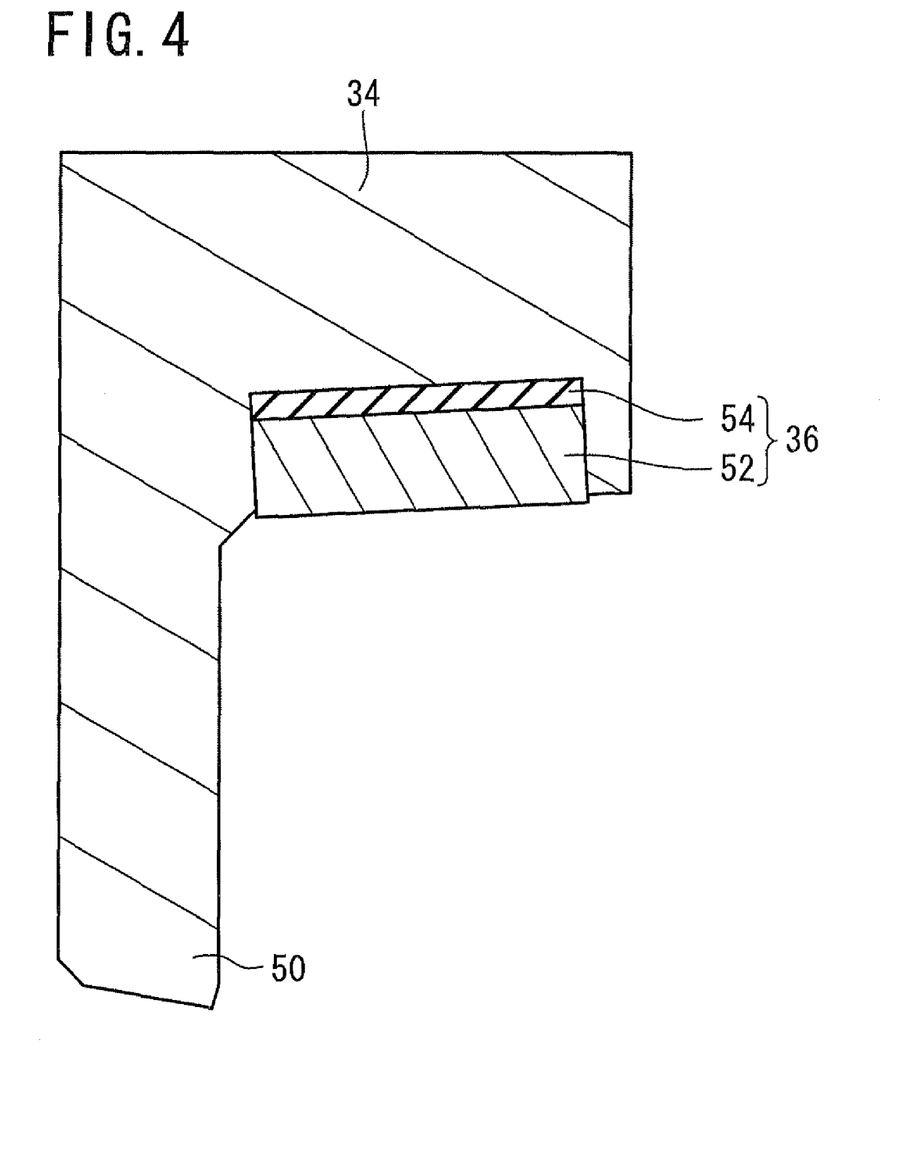
FIG. 4 is an enlarged cross-sectional view of a second slide core of the molding die shown in FIG. 3.
Figure 5:
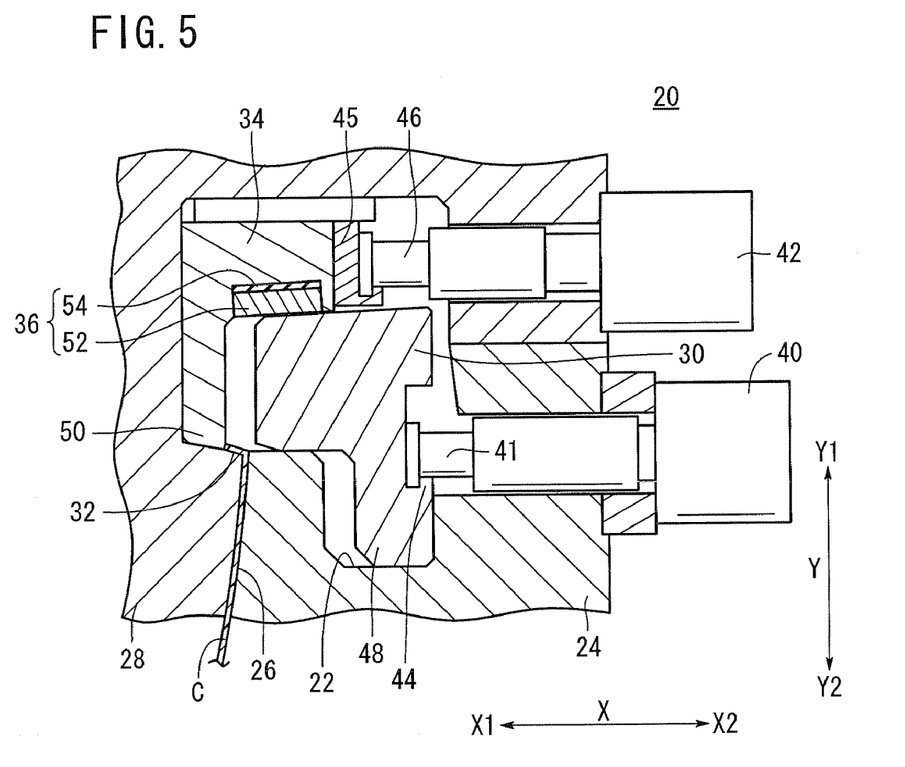
FIG. 5 is a fragmentary cross-sectional view showing the manner in which a first slide core is moved when the molding die shown in FIG. 3 is opened.

The molding die 20 comprises a fixed die 24 having a recess 22 defined in an upper surface thereof, which faces in the direction indicated by the arrow $Y_1$ in FIG. 3, and a movable die 28 positioned in confronting relation to the fixed die 24 and defining a cavity 26 between the movable die 28 and the fixed die 24. The fixed die 24 has a first fluid-pressure cylinder 40 mounted thereon. The movable die 28 has a second fluid-pressure cylinder 42 mounted thereon.

The movable die 28 is displaceable in the die closing direction indicated by the arrow $Y_2$, as well as in the die opening direction indicated by the arrow $Y_1$. The movable die 28 is shown as having an integral structure, up to a portion thereof that holds the second fluid-pressure cylinder 42. However, the portion of the movable die 28, which holds the second fluid-pressure cylinder 42, and the portion of the movable die 28, which defines the cavity 26, may be disposed separately from each other.

The first fluid-pressure cylinder 40 mounted on the fixed die 24 includes a piston rod 41 having a distal end thereof fitted in a concave lock member 44 provided on a side surface of a first slide core 30.

The first slide core 30 is slidable in directions perpendicular to the directions along which the molding die 20 is capable of being opened and closed. The first slide core 30 and the movable die 28 jointly define a cavity 32 therebetween, which is held in fluid communication with the cavity 26. The first fluid-pressure cylinder 40 is capable of displacing the first slide core 30 in the directions indicated by the arrows $X_1$ and $X_2$. The first slide core 30 has a downward protrusion 48 that abuts in engagement with a wall of the fixed die 24, which defines the recess 22. A second slide core 34 is disposed between the first slide core 30 and the movable die 28, and includes a presser 36 on a lower surface thereof, which is held in contact with a surface of the first slide core 30.

The second fluid-pressure cylinder 42 includes a piston rod 46. A distal end of the piston rod 46 is fitted in a lock member 45 of the second slide core 34.

The cavity 32, which is defined between the first slide core 30 and the movable die 28, serves to mold an inward curved or bent edge of an automobile bumper C. The cavity 32 has one end thereof defined by a distal end 50 of the second slide core 34. As described later, the distal end 50 of the second slide core 34 functions to perform an undercutting process when the molded automobile bumper C is removed from the molding die 20.

The second slide core 34 extends upwardly in FIG. 3 from the distal end 50, is bent around an upper end corner of the first slide core 30, and extends toward the piston rod 46 of the second fluid-pressure cylinder 42, which is mounted on the movable die 28.

The second slide core 34 is displaceable vertically in unison with the movable die 28. The second slide core 34 includes the lock member 45, which engages the piston rod 46 of the second fluid-pressure cylinder 42. Therefore, when the second fluid-pressure cylinder 42 is actuated to move the piston rod 46 in the direction indicated by the arrow $X_1$ or $X_2$, the second slide core 34 also moves in the direction indicated by the arrow $X_1$ or $X_2$.

The presser 36 is fastened by bolts, not shown, to the second slide core 34, which faces an upper surface of the first slide core 30. The presser 36 comprises a pressing contact plate 52 made of metal, and a reactive force plate 54 made of urethane. When the first slide core 30 is not held against the second slide core 34, the pressing contact plate 52 projects a distance ranging from 0.1 to 0.2 mm downwardly from the lower surface of the second slide core 34 (see FIG. 4).

The molding die 20 according to the second embodiment of the present invention basically is constructed as described above. Operations and advantages of the molding die 20 will be described below.

First, a process of closing and clamping the molding die 20 to form the cavities 26, 32 will be described below.

The movable die 28 and the second slide core 34 are displaced toward the fixed die 24 in the direction indicated by the arrow $Y_2$ in FIG. 3. At this time, the piston rod 41 of the first fluid-pressure cylinder 40 is retracted, thereby holding the first slide core 30 in a retracted position, i.e., against a wall of the recess 22 in the direction indicated by the arrow $X_2$ in FIG. 3. The piston rod 46 of the second fluid-pressure cylinder 42 is pressed against the lock member 45, thereby holding the second slide core 34 against the movable die 28. Then, the first fluid-pressure cylinder 40 is actuated to extend the piston rod 41, thereby moving the first slide core 30 in the direction indicated by the arrow $X_1$ in FIG. 3, until the distal end of the first slide core 30 presses against the distal end 50 of the second slide core 34. At this time, the upper surface of the first slide core 30 presses the presser 36 in opposition to the resiliency of the reactive force plate 54. At this time as well, the presser 36 is fixed in place while the presser 36 presses against the first slide core 30.

Also, at this time, the cavity 26 and the cavity 32 are defined between the fixed die 24, the movable die 28, the second slide core 34, and the first slide core 30.

As shown in FIG. 3, the presser 36 is disposed in a region generally in line with the longitudinal direction of the cavity 26. A molten synthetic resin is introduced into the cavities 26, 32. More specifically, the molten synthetic resin flows from the cavity 26 into the cavity 32 under a certain pressure. Under the pressure of the molten synthetic resin as the resin flows from the cavity 26 into the cavity 32, the first slide core 30 is pushed in the direction indicated by the arrow $Y_1$, as well as in the direction indicated by the arrow $X_2$. The pressure, which pushes the first slide core 30 in the direction indicated by the arrow $X_2$, is borne mainly by the piston rod 41 of the first fluid-pressure cylinder 40.

Under the pressure applied in the direction indicated by the arrow $Y_1$, the first slide core 30 tends to move upwardly as shown in FIG. 3. At this time, such pressure is applied to the pressing contact plate 52. Since the reactive force plate 54, which is joined to the pressing contact plate 52, is a resilient body made of urethane, the reactive force plate 54 produces reactive forces in response to the pressure applied to the pressing contact plate 52. Therefore, the presser 36 presses the first slide core 30 strongly against the fixed die 24.

After elapse of a certain period of time, the molten synthetic resin in the cavities 26, 32 becomes solidified, thereby forming an automotive bumper C with an undercut.

When the automotive bumper C is produced upon solidification of the molten synthetic resin, a process for opening the molding die 20 is started. Initially, the first fluid-pressure cylinder 40 is actuated to move the first slide core 30 in the recess 22 in the direction indicated by the arrow $X_2$. At this time, a gap is created between the first slide core 30 and the second slide core 34 (see FIG. 5).

When the first slide core 30 is retracted, i.e., when the first slide core 30 is moved in the direction indicated by the arrow $X_2$, the movable die 28 is released from the first slide core 30, thereby allowing the movable die 28 and the second slide core 34 to move in unison with each other in the direction indicated by the arrow $Y_1$. The second fluid-pressure cylinder 42 also is movable in the direction indicated by the arrow $Y_1$. At this time, the automotive bumper C, which is molded in the cavities 26, 32, moves with the movable die 28 in the direction indicated by the arrow $Y_1$, while being mounted on the surface of the movable die 28 that faces the fixed die 24 (see FIG. 6).

Figure 6:
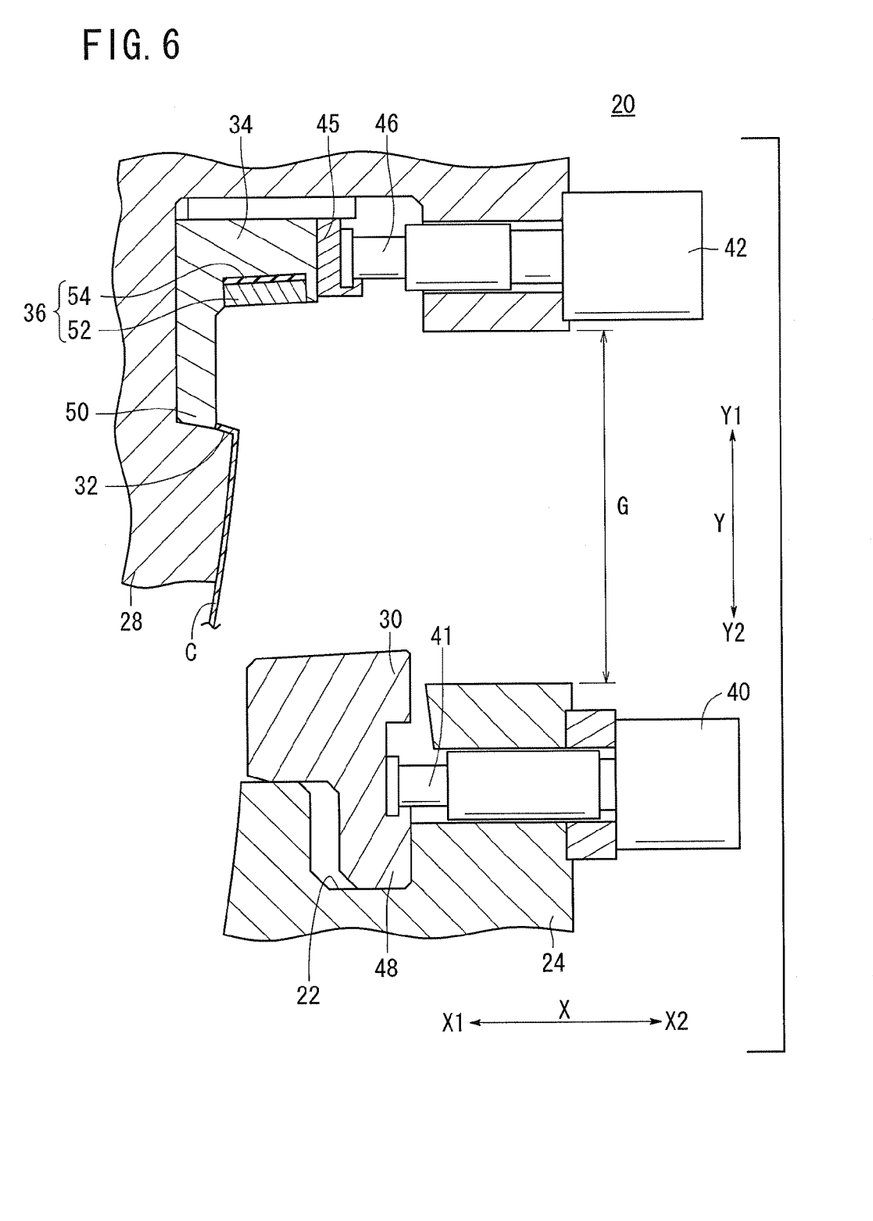
FIG. 6 is a fragmentary cross-sectional view showing the manner in which, after the first slide core has been moved, a movable die, the second slide core, and a second cylinder are moved upwardly in unison with each other during opening of the molding die shown in FIG. 3.
Figure 7:
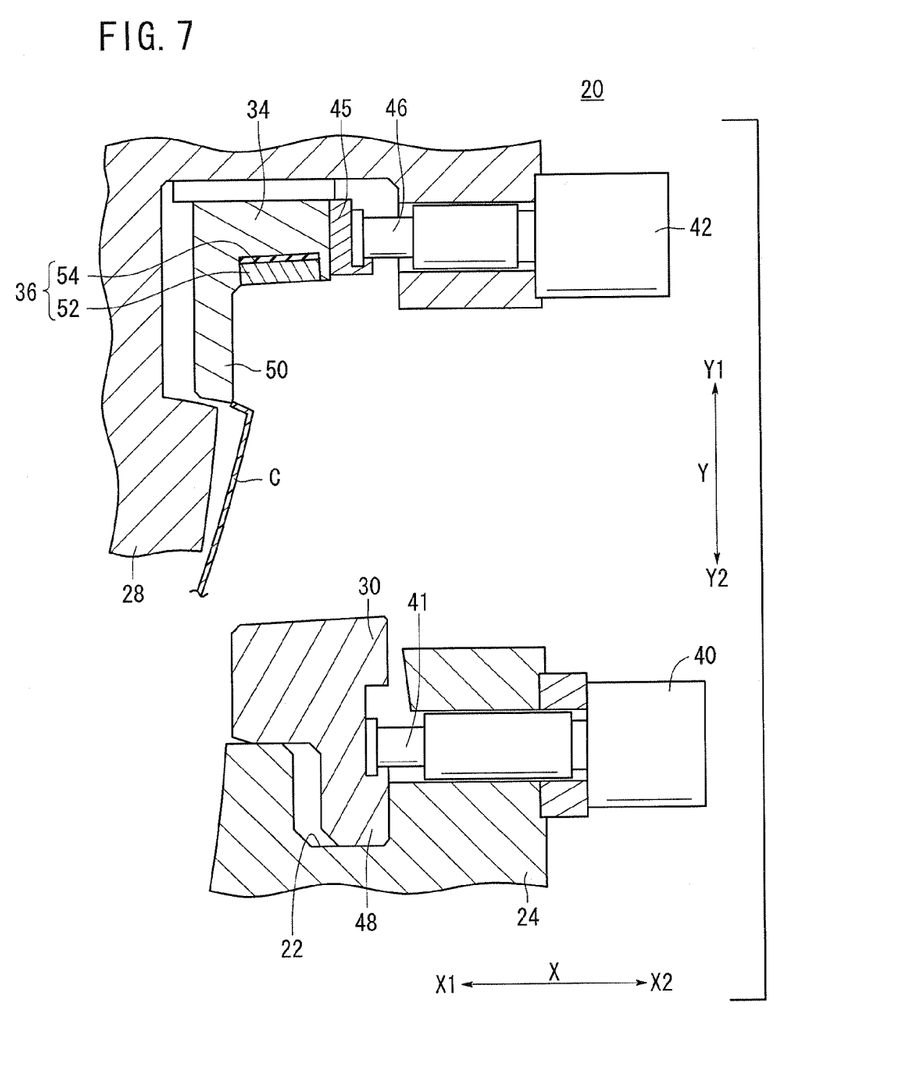
FIG. 7 is a fragmentary cross-sectional view showing the manner in which, after the movable die, the second slide core, and the second cylinder have been moved upwardly, an undercutting process is carried out during opening of the molding die shown in FIG. 3.

In FIG. 6, after the movable die 28 and the second slide core 34 have been moved a distance G in the direction indicated by the arrow $Y_1$, the second fluid-pressure cylinder 42 mounted on the movable die 28 is actuated to retract the piston rod 46, thus moving the second slide core 34 together with the lock member 45 in the direction indicated by the arrow $X_2$. At this time, the distal end 50 of the second slide core 34 pushes against the end (inward bent edge) of the automotive bumper C in the direction indicated by the arrow $X_2$ (see FIG. 7). Accordingly, the molded automotive bumper C is separated from the molding end surface of the movable die 28, and can be removed from the molding die 20.

According to the present embodiment, the molding die 20 includes the second slide core 34 for allowing the automotive bumper C with the undercut therein to be easily removed from the molding die 20.

As described above, the molding die 20 according to the present embodiment comprises the fixed die 24 including the first fluid-pressure cylinder 40, the movable die 28 that faces the fixed die 24, the first slide core 30 that engages with the fixed die 24, and the second slide core 34, which is disposed in a position facing toward the fixed die 24 across the first slide core 30, and defining the cavities 26, 32 for molding a product with an undercut therein in coaction with the movable die 28 and the first slide core 30. The movable die 28 includes the second fluid-pressure cylinder 42, which enables the distal end of the second slide core 34 to separate the molded product away from the movable die 28.

Pressure produced when the molten synthetic resin is introduced into the cavities 26, 32 is borne by the pressing contact plate 52 of the presser 36 through the first slide core 30. In response to such applied pressure, the reactive force plate 54, which is joined to the pressing contact plate 52, applies reactive forces to the fixed die 24 through the first slide core 30. As a result, the first slide core 30 and the fixed die 24 remain in firm engagement with each other, thereby preventing parting lines from appearing on the product that is molded between the first slide core 30 and the fixed die 24. Consequently, the molded product including the undercut is free of burrs and is excellent in appearance.

In addition, since the molded automotive bumper C is removed from the movable die 28 by the distal end 50 of the second slide core 34, both the movable die 28 and the second slide core 34 possess a sufficient level of mechanical strength. The molding die 20 is therefore mechanically strong and can be reduced in size.

Although certain preferred embodiments of the present invention have been shown and described in detail, it should be understood that various changes and modifications may be made to the embodiments without departing from the scope of the invention as set forth in the appended claims.

What is claimed is:

1. A molding die comprising:
   a fixed die including an actuator;
   a movable die facing the fixed die and movable toward and away from the fixed die;
   a slide core slidable in sliding engagement with the fixed die; and
   a presser having a first surface engaging the movable die and a second surface engaging the slide core, the second surface of the presser being parallel relative to the first surface and pressing the slide core in a direction transverse to directions in which the slide core is slidable,
   wherein the presser includes a member for producing reactive forces against the pressure of a molten material, which is introduced into a cavity defined between the fixed die, the movable die, and the slide core, in order to mold a product with an undercut, and
   wherein when the slide core is in a not-pressed state, the presser projects from the slide core.

2. A molding die according to claim 1, wherein the member is made of a resilient material.

3. A molding die according to claim 1, wherein the presser is mounted on the movable die for pressing contact with the slide core, and faces toward a direction in which the molten material is introduced into the cavity.

4. A molding die according to claim 1, wherein the member is made of urethane.

5. A molding die comprising:

a fixed die including a first actuator;

a movable die facing the fixed die and movable toward and away from the fixed die;

a first slide core slidable in sliding engagement with the fixed die; and a second slide core disposed in a position facing the fixed die across the first slide core, and movable into and out of abutment against the movable die and the first slide core, the second slide core having a presser which includes a first surface engaging the first slide core and a second surface engaging the second slide core, the second surface of the presser being parallel relative to the first surface, wherein the first surface of the presser presses the first slide core in a direction transverse to directions in which the first slide core is slidable when the second slide core is held in pressing contact with the first slide core;

the movable die having a second actuator for displacing the second slide core;

the presser including a member for producing reactive forces against the pressure of a molten material, which is introduced into a cavity defined between the fixed die, the movable die, the first slide core, and the second slide core, in order to mold a product with an undercut, and wherein when the slide core is in a not-pressed state, the presser projects from the slide core.

6. A molding die according to claim 5, wherein the member is made of a resilient material.

7. A molding die according to claim 5, wherein the presser is mounted on the second slide core for pressing contact with the first slide core, and faces toward a direction in which the molten material is introduced into the cavity.

8. A molding die according to claim 5, wherein the member is made of urethane.

* * * * *